United States Patent
Griffin et al.

(10) Patent No.: US 12,450,376 B2
(45) Date of Patent: Oct. 21, 2025

(54) QUBIT-IMPLEMENTED ROLE-BASED ACCESS CONTROL

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 718 days.

(21) Appl. No.: 17/876,947

(22) Filed: Jul. 29, 2022

(65) Prior Publication Data

US 2024/0037260 A1 Feb. 1, 2024

(51) Int. Cl.
*G06F 21/62* (2013.01)
*G06N 10/20* (2022.01)
*G06N 10/40* (2022.01)

(52) U.S. Cl.
CPC ......... *G06F 21/6218* (2013.01); *G06N 10/20* (2022.01); *G06N 10/40* (2022.01)

(58) Field of Classification Search
CPC .... G06F 21/6218; G06N 10/20; G06N 10/40; G06N 10/80
See application file for complete search history.

(56) References Cited

U.S. PATENT DOCUMENTS

| | | |
|---|---|---|
| 2020/0387821 A1 | 12/2020 | Griffin et al. |
| 2021/0334237 A1 | 10/2021 | Coady et al. |
| 2021/0357186 A1 | 11/2021 | Griffin et al. |
| 2021/0374583 A1 | 12/2021 | Griffin et al. |
| 2021/0406747 A1 | 12/2021 | Coady et al. |
| 2022/0027323 A1 | 1/2022 | Coady et al. |
| 2022/0066985 A1 | 3/2022 | Griffin et al. |

OTHER PUBLICATIONS

Lirong Qiu et al., "Quantum digital signature for the access control of sensitive data in the big data era", Future Generation Computer Systems 86, pp. 372-379, 2018.*
Unknown Author, "The Quantum Scalar Security Framework: A Technical White Paper", 2021.*

* cited by examiner

*Primary Examiner* — Omar F Fernandez Rivas
(74) *Attorney, Agent, or Firm* — Dority & Manning, P.A.

(57) ABSTRACT

A quantum computing system receives, from a requestor, a first access request that identifies a subject, an action, and a resource. A mapping structure that identifies a plurality of qubits that are in superposition and encoded with a plurality of rules that govern access to the resource is accessed. Based on the mapping structure it is determined that a set of qubits of the plurality of qubits applies to the access request. Data encoded in the set of qubits or a reference to each qubit in the set of qubits is provided to the requestor.

20 Claims, 5 Drawing Sheets

QUBIT-IMPLEMENTED ROLE-BASED ACCESS CONTROL

BACKGROUND

A quantum bit ("qubit") in superposition can be in multiple states simultaneously. Multiple qubits in superposition can be in an exponential number of states simultaneously, which is an advantage over classical bits when solving certain problems.

SUMMARY

The examples disclosed herein incorporate RBAC rules in quantum instruction files. An access request may be received from a requestor, and in response, a plurality of qubits that are in superposition and encoded with a plurality of rules that govern the access are accessed. A set of qubits that applies to the specific access request are determined, and the data encoded in the set of qubits, or a reference to each qubit in the set of qubits is provided to the requestor.

In one example a method is provided. The method includes receiving, by a quantum computing system from a requestor, a first access request that identifies a subject, an action, and a resource. The method further includes accessing a mapping structure that identifies a plurality of qubits that are in superposition and encoded with a plurality of rules that govern access to the resource. The method further includes determining, based on the mapping structure, a set of qubits of the plurality of qubits that applies to the access request. The method further includes providing data encoded in the set of qubits or a reference to each qubit in the set of qubits to the requestor.

In another example a quantum computing system is provided. The quantum computing system includes a memory and a processor device coupled to the memory. The processor device is to receive, by a quantum computing system from a requestor, a first access request that identifies a subject, an action, and a resource. The processor device is further to access a mapping structure that identifies a plurality of qubits that are in superposition and encoded with a plurality of rules that govern access to the resource. The processor device is further to determine, based on the mapping structure, a set of qubits of the plurality of qubits that applies to the access request. The processor device is further to provide data encoded in the set of qubits or a reference to each qubit in the set of qubits to the requestor.

In another example a non-transitory computer-readable storage medium is provided. The non-transitory computer-readable storage medium includes executable instructions to cause a processor device of a quantum computing system to receive, by a quantum computing system from a requestor, a first access request that identifies a subject, an action, and a resource. The instructions further cause the processor device to access a mapping structure that identifies a plurality of qubits that are in superposition and encoded with a plurality of rules that govern access to the resource. The instructions further cause the processor device to determine, based on the mapping structure, a set of qubits of the plurality of qubits that applies to the access request. The instructions further cause the processor device to provide data encoded in the set of qubits or a reference to each qubit in the set of qubits to the requestor.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

A quantum bit ("qubit") in superposition can be in multiple states simultaneously. Multiple qubits in superposition can be in an exponential number of states simultaneously, which is an advantage over classical bits when solving certain problems.

Computing devices often implement role-based access control (RBAC) based on a subject, such as a task or process; an action, such as a read action, a write action, a delete action, a generate action; and a resource, such as a file, an application programming interface, a database, or the like. RBAC rules are often expressed in one or more documents, such as, by way of non-limiting example, XML documents, and as the number of potential users increase and the number of potential resources increase, can become quite large. Processing such RBAC rules to determine whether a subject can be granted access to a resource can be time-consuming and can delay processing until it can be determined whether a request should be granted or denied.

The examples disclosed herein incorporate RBAC rules in quantum instruction files. An access request may be received from a requestor, and in response, a plurality of qubits that are in superposition and encoded with a plurality of rules that govern the access are accessed. A set of qubits that applies to the specific access request are determined, and the data encoded in the set of qubits, or a reference to each qubit in the set of qubits is provided to the requestor. The examples disclosed herein greatly reduce the amount of time it takes to process a plurality of RBAC rules.

Figure 1:
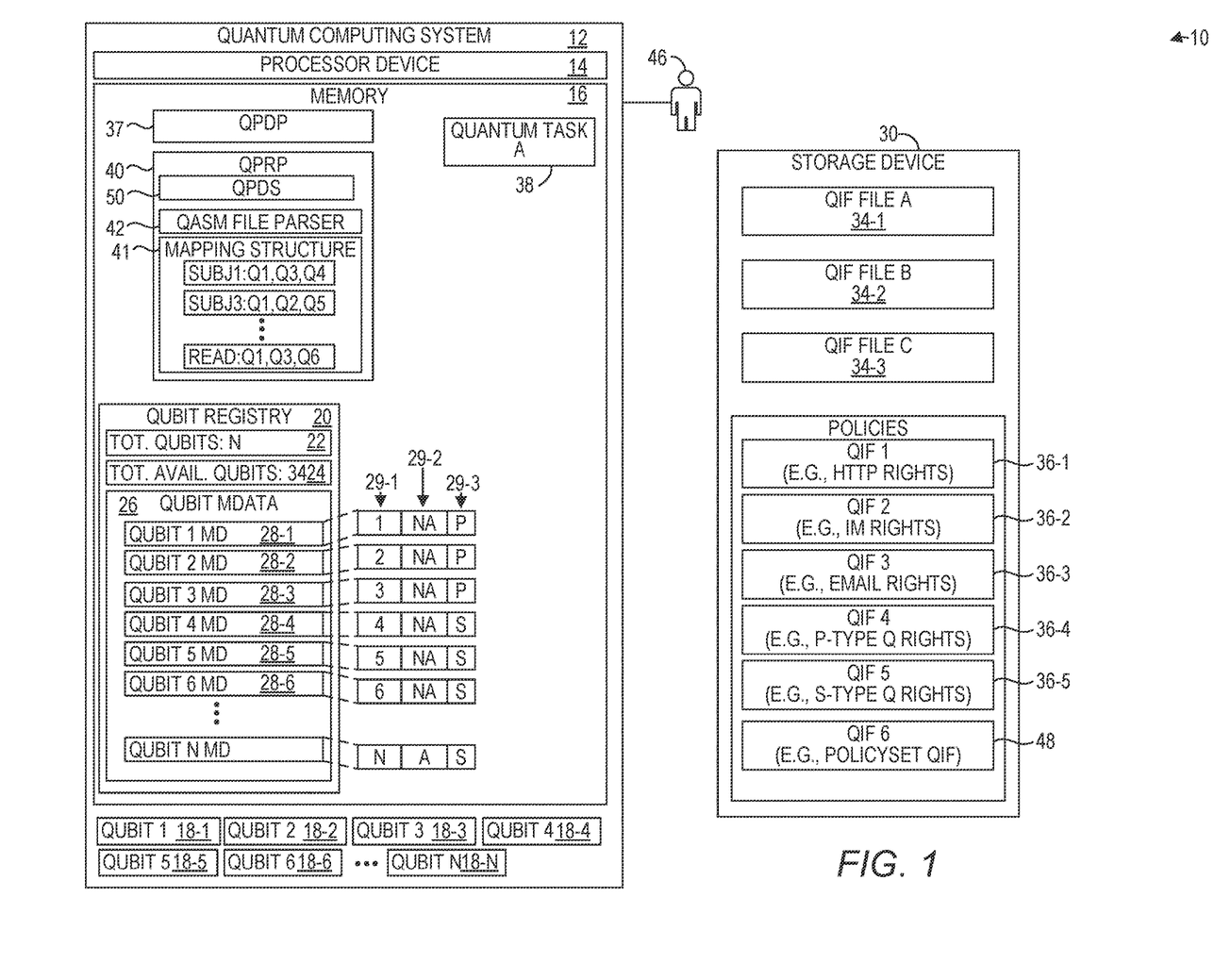
FIG. 1 is a block diagram of an environment in which examples of qubit-implemented role-based access control can be practiced according to one implementation.

FIG. 1 is a block diagram of an environment 10 in which examples may be practiced. The environment 10 includes a quantum computing system 12 which operates in a quantum environment but can operate using classical computing principles or quantum computing principles. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements a plurality of qubits 18-1-18-N (generally, qubits 18). The number of qubits 18 could comprise hundreds or thousands of qubits 18. The quantum computing system 12 includes a qubit registry 20 which maintains information about the qubits 18-1-18-N, including, by way of non-limiting example, a total qubits counter 22 that maintains count of the total number of qubits 18 implemented by the quantum computing system 12, and a total available qubits counter 24 that maintains count of the total number of qubits 18 that are currently available for allocation.

The qubit registry 20 also maintains qubit metadata 26, which comprises a plurality of qubit registry records 28-1-28-N, each of which maintains information about a corresponding qubit 18-1-18-N, such as, by way of non-limiting example, a field 29-1 that contains an identifier of the corresponding qubit 18-1-18-N, a field 29-2 that identifies whether the qubit is available for use ("A") or not available for use ("NA"), and a field 29-3 that identifies the type of the corresponding qubit 18, such as, by way of non-limiting example, a photonic qubit (P), a semiconductor qubit (S), or some other type of qubit.

The quantum computing system 12 includes or is communicatively coupled to one or more storage devices 30. The storage device 30 has stored thereon a plurality of quantum instruction files 34-1-34-3, 36-1-36-5 and 48 that contain quantum instructions in a quantum programming language syntax, such as, by way of non-limiting example, QASM, Quil, OpenQASM, or the like. The quantum instruction files (QIFs) 34-1-34-3 (generally, QIFs 34) contain quantum instructions that refer to and, when executing, manipulate one or more of the qubits 18 to provide a desired functionality.

The QIFs 36-1-36-5 (generally, QIFs 36) correspond to RBAC rules. Each QIF 36 comprises quantum instructions that, when executed, encode one or more qubits 18 with the corresponding RBAC rules to which the QIF 36 corresponds. The RBAC rules may be based on subject, action and resource. As an example, the QIF 36-1 contains quantum instructions that, when executed, place a plurality of qubits 18 into superposition with RBAC rules that define access control rights related to the use of HTTP on the quantum computing system 12. The quantum instructions may, for example, modify physical characteristics of the qubits 18, such as polarity and spin to put them in a desired state. As another example, the QIF 36-4 contains quantum instructions that, when executed, place a plurality of qubits 18 into superposition with RBAC rules that define access control rights related to the use of photonic qubits (i.e., type 1) on the quantum computing system 12.

The QIFs 36 may contain, or have associated therewith, QIF metadata that identifies a quantity of qubits 18 to be used by the respective QIF 36 to define the access rights encoded in the respective QIF 36. In some implementations, the QIF metadata may be in the form of commented lines contained within the respective QIF 36. In other implementations the QIF metadata may be stored in a header portion of the QIF 36.

As an example of qubit-implemented role-based access control according to one implementation, assume that a quantum task 38 executing in the memory 16 requests allocation of a photonic-type qubit 18. The request may comprise, for example, a direct or indirect (i.e., routed by, for example, the operating system) call to a quantum policy decision point (QPDP) 37. The request may include information that identifies a subject, in this example the quantum task 38, an action, in this example an allocation action, and a resource, in this example a photonic-type qubit. The QPDP 37 may, in turn, generate and send an access request that identifies the subject, action and resource to a quantum policy retrieval point (QPRP) 40. In this example, the subject may be a process identifier (PID) of the quantum task 38 or metadata associated with the quantum task 38, such as a user identifier of the user who caused the initiation of the quantum task 38. The action may be an allocate action, and the resource may be a photonic-type qubit.

Prior to this point in time, the QPRP 40 initiated the QIFs 36-1-36-5 to encode the rules that govern access to the resource, in this case, a photonic qubit, in a plurality of qubits 18. In particular, in this example, the QIF 36-4 is the QIF that governs access to the identified resource. Prior to initiating the QIF 36-4, the QPRP 40 determined the number of qubits 18 to be used by the QIF 36-4. As discussed above, in some implementations, the QPRP 40 accesses QIF metadata associated with the QIF 36-4 that identifies the quantity of qubits to be used by the QIF 36-4. In some implementations, a QIF file parser 42 may parse the quantum instructions in the QIF 36-4 to determine the quantity of qubits to be used by the QIF 36-4. In particular, the QIF file parser 42 may scan for keywords that correspond to the allocation and/or manipulation of qubits in the particular quantum programming language in which the QIF 36-4 is written. The QIF file parser 42 may then determine, based on the analysis of such keywords, the quantity of qubits utilized by the QIF 36-4.

In this example, the QPRP 40 determined that the QIF 36-4 utilizes three qubits 18 to encode the rules contained within the QIF 36-4. The QPRP 40 requests, from the qubit registry 20, three qubits 18. In this example, the qubit registry 20 returns identifiers to the qubits 18-4-18-6, and modifies the qubit registry records 28-3-28-6 to indicate that the qubits 18-4-18-6 have been allocated, and thus are not available to any other task.

The QPRP 40 initiated the QIF 36-4 to place the qubits 18-4-18-6 into superposition with the RBAC rules encoded in the QIF 36-4. As the QPRP 40 initiates the QIFs 36 to encode the rules that govern access to resource into the qubits 18, the QPRP 40 generates a mapping structure 41. The mapping structure 41 maps subjects, actions and/or resources to specific qubits 18 that have the respective subject, action and resource encoded therein. The QPRP 40 may generate the mapping structure 41 by parsing the respective QIFs 36 scanning for subject, action and resource keywords contained in the QIFs 36 and correlating the identified subjects, actions and resources with the qubits 18 that were allocated to the respective QIF 36. The mapping structure 41 may comprise hundreds or thousands of entries that map each subject, action and/or resource of a rule governing a resource to a particular qubit 18.

In response to the access request received by the QPRP 40 from the QPDP 37, the QPRP 40 accesses the mapping structure 41 to determine a set of qubits 18 that applies to this particular access request. For example, assume that 250 qubits 18 have been encoded with rules that govern access to resources. The QPRP 40 determines, based on the mapping structure 41, that the qubits 18-4-18-6 govern this particular access request. In one implementation, the QPRP 40 may readout the qubits 18-4-18-6 and provide the data encoded in the qubits 18-4-18-6 to the QPDP 37. In another implementation, the QPRP 40 may send qubit references that identify the qubits 18-4-18-6 to the QPDP 37.

The QPDP 37 may then process the qubits 18-4-18-6 to determine whether the subject associated with the request has privileges to request allocation of a photonic qubit. In this example, the QPDP 37 determines that the subject does have the appropriate privileges to request allocation of a photonic qubit. The QPDP 37 may then grant the access request, and pass the access request to the qubit registry 20 for fulfillment by the qubit registry 20.

As another example of qubit-implemented role-based access control according to one implementation, assume that the quantum task 38 next requests allocation of a semiconductor-type qubit 18. The request for the semiconductor-type qubit 18 is routed to the QPDP 37. The QPDP 37 generates an appropriate access request and sends the access request to the QPRP 40. The QPRP 40 determines, based on the mapping structure 41, that the qubits 18-4-18-5 govern this particular access request. In one implementation, the QPRP 40 reads out the qubits 18-4-18-5 and provides the data encoded in the qubits 18-4-18-5 to the QPDP 37. In this example, the QPDP 37 determines that the subject does not have the appropriate privileges to request allocation of a semiconductor-type qubit. The QPDP 37 may then deny the access request and return a denial result to the quantum task 38.

In some examples a set of QIFs 36 may encode access control rights that relate to similar subject matter. As an example, the QIFs 36-1, 36-2 and 36-3 each relate to network-related access control rights. In particular, the QIF 36-1 encodes RBAC rules associated with HTTP rights, the QIF 36-2 encodes RBAC rules associated with instant message (IM) rights, and the QIF 36-3 encodes RBAC rules associated with email rights.

It may be desirable to aggregate a plurality of related QIFs 36 into a policyset. A policyset layers/combines different privileges relating to a resource. As a simple example, a first QIF file may define read access rights to a file by a particular subject; a second QIF file may define write access rights to the file by the same subject; and a third QIF file may define copy access rights to the file by the same subject. A policyset can be generated that combines the three access rights and facilitates quicker pattern matching to determine whether the access right sought by the subject is authorized.

The QPRP 40 includes a quantum policy document service (QPDS) 44 that operates to, upon request, generate a policyset QIF that combines the rules of related QIFs 36. In this example, an operator 46 submits a request to the QPRP 40 to combine the QIFs 36-1-36-3 into a policyset QIF. The QPDS 44 then accesses the QIFs 36-1-36-3 to generate a policyset QIF 48. The policyset QIF 48 is an aggregate QIF that contains the RBAC rules of the QIFs 36-1-36-3. The policyset QIF 48 may subsequently be initiated by the QPRP 40 to load into a plurality of qubits 18 the RBAC rules associated with IM messages, email messages and HTTP message simultaneously via superposition.

It is noted that, because the because the QPDP 37 and the QPRP 40 are components of the quantum computing system 12, functionality implemented by the QPRP 40 and the QPDP 37 may be attributed to the quantum computing system 12 generally. Moreover, in examples where the QPRP 40 and the QPDP 37 comprise software instructions that program the processor device 14 to carry out functionality discussed herein, functionality implemented by the QPRP 40 and the QPDP 37 may be attributed herein to the processor device 14.

Figure 2:
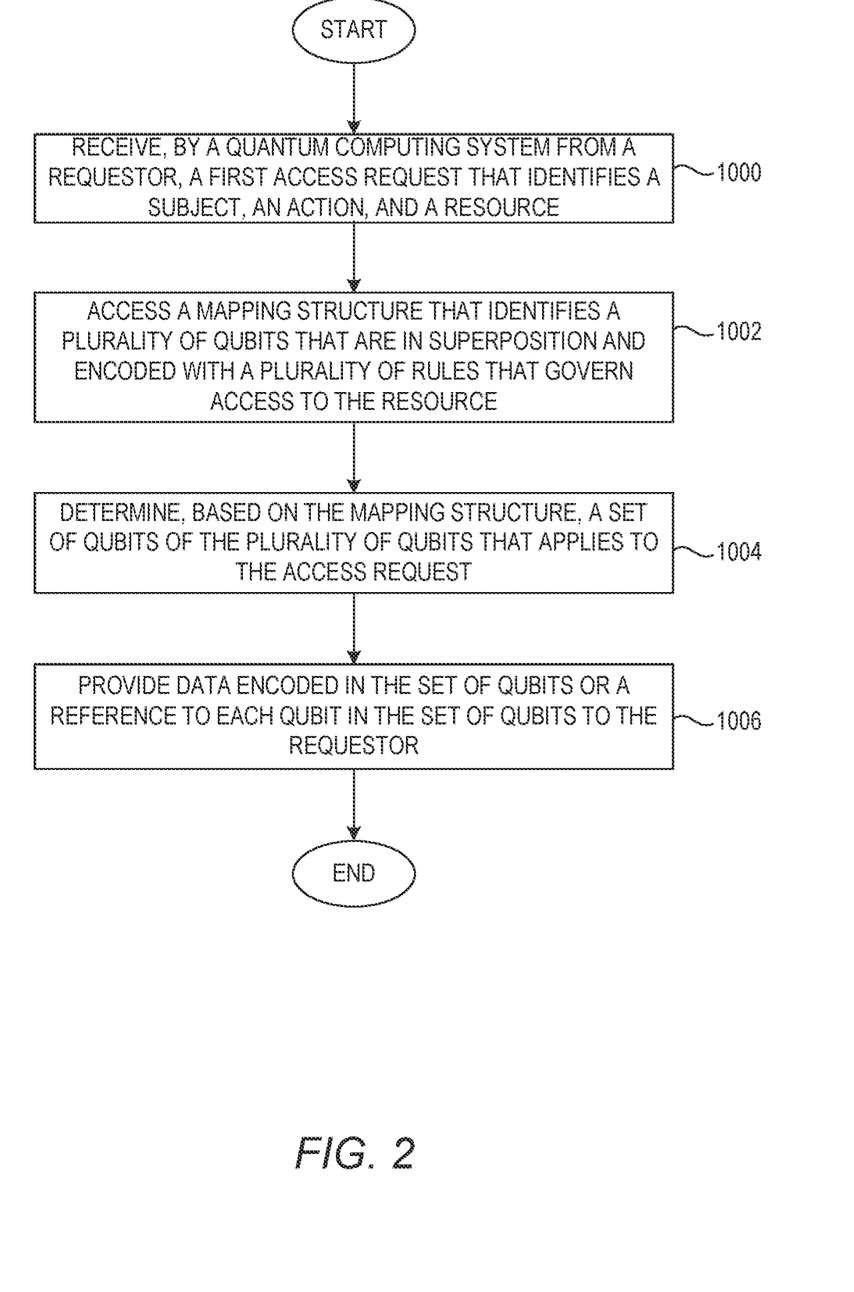
FIG. 2 is a flowchart of a method for qubit-implemented role-based access control according to one implementation.

FIG. 2 is a flowchart of a method for qubit-implemented role-based access control according to one implementation. FIG. 2 will be discussed in conjunction with FIG. 1. The quantum computing system 12 receives, from a requestor such as the QPDP 37, a first access request that identifies a subject, an action, and a resource (FIG. 2, block 1000). The quantum computing system 12 accesses the mapping structure 41 that identifies the plurality of qubits 18 that are in superposition and encoded with a plurality of rules that govern access to the resource (FIG. 2, block 1002). The quantum computing system 12 determines, based on the mapping structure 41, a set of qubits 18 of the plurality of qubits 18 that applies to the access request (FIG. 2, block 1004). The quantum computing system 12 provides data encoded in the set of qubits 18 or a reference to each qubit 18 in the set of qubits 18 to the requestor (FIG. 2, block 1006).

Figure 3:
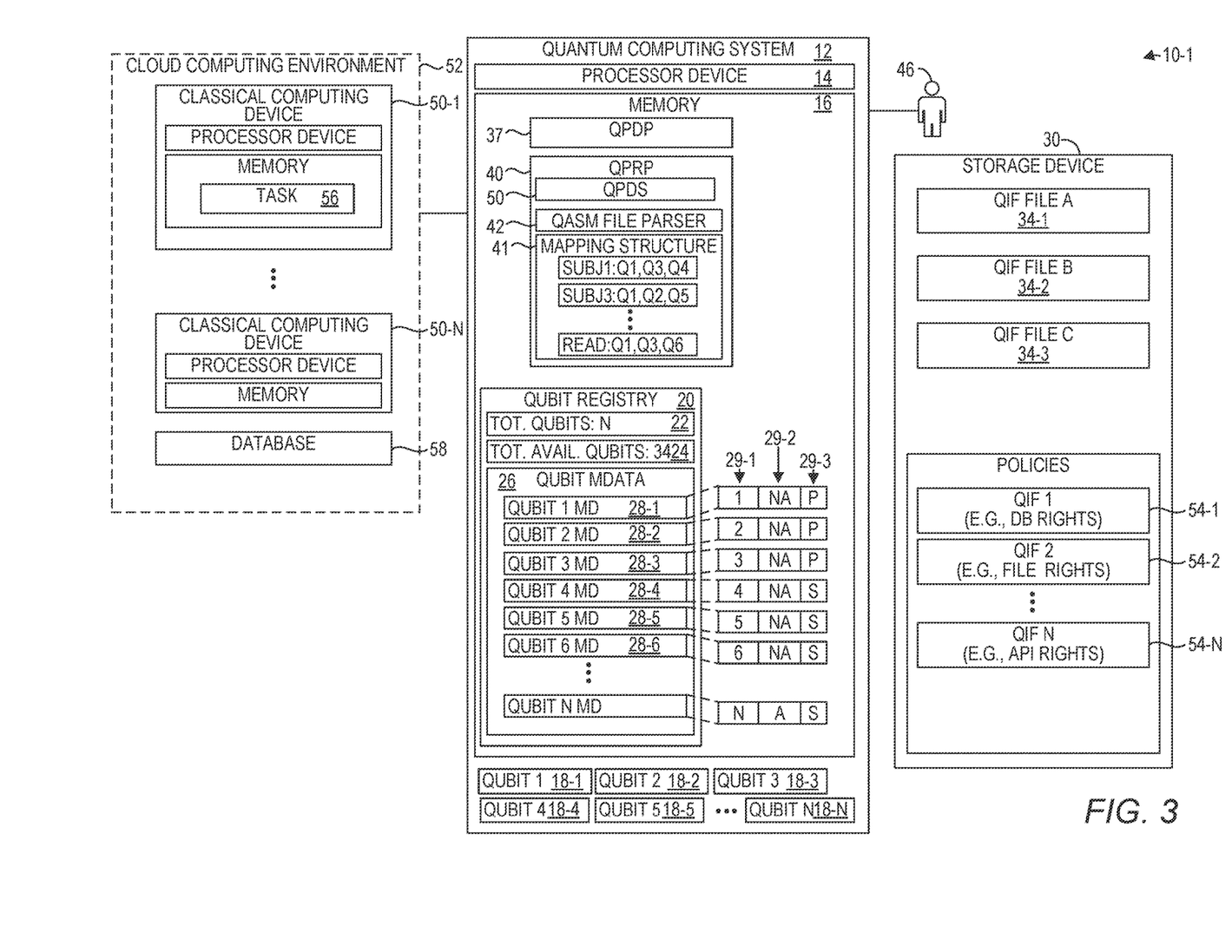
FIG. 3 is a block diagram of an environment in which examples of qubit-implemented role-based access control can be practiced according to another implementation.

FIG. 3 is a block diagram of an environment 10-1 in which examples of qubit-implemented role-based access control can be practiced according to another implementation. The environment 10-1 is substantially similar to the environment 10 except as otherwise discussed herein. In this example, the quantum computing system 12 provides RBAC services to a plurality of classical computing devices 50-1-50-N (generally, computing devices 50). In some examples, the computing devices 50 may be part of a cloud computing environment 52. The storage device 30 may comprise a plurality of QIFs 54-1-54-N that, when executed, modify a plurality of qubits 18 to contain rules that govern an access request associated with a computing device 50. As an example, a QIF 54-1 contains quantum instructions that, when executed, place a plurality of qubits 18 into superposition with RBAC rules that define access control rights related to the use of a database in the cloud computing environment 52. A QIF 54-2 contains quantum instructions that, when executed, place a plurality of qubits 18 into superposition with RBAC rules that define access control rights related to the use of a file in the cloud computing environment 52. A QIF 54-3 contains quantum instructions that, when executed, place a plurality of qubits 18 into superposition with RBAC rules that define access control rights related to the use of a particular application programming interface (API) in the cloud computing environment 52.

As an example of qubit-implemented role-based access control according to this implementation, assume that a task 56 executing on the computing device 50-1 seeks access to a database 58. The task 56 attempts to open a connection to the database 58. The operating system of the computing device 50-1 receives the attempt to open the connection to the database 58, and generates an access request that identifies the task 56, identifies an action as an open action, and identifies the database 58 as the resource. The operating system of the computing device 50-1 communicates the access request to the QPDP 37. The QPDP 37 forwards the access request to the QPRP 40. The QPRP 40 accesses the mapping structure 41 to determine a set of qubits 18 that applies to this particular access request. In this example the QPRP 40 determines, based on the mapping structure 41, that the qubits 18-1-18-4 govern this particular access request. The QPRP 40 provides, to the QPDP 37, qubit references that identify the qubits 18-1-18-4. The QPDP 37 reads out the qubits 18-1-18-4 and determines that the subject does have the appropriate privileges to request access to the database 58. The QPDP 37 may then send a message granting the access request to the computing device 50-1.

Figure 4:
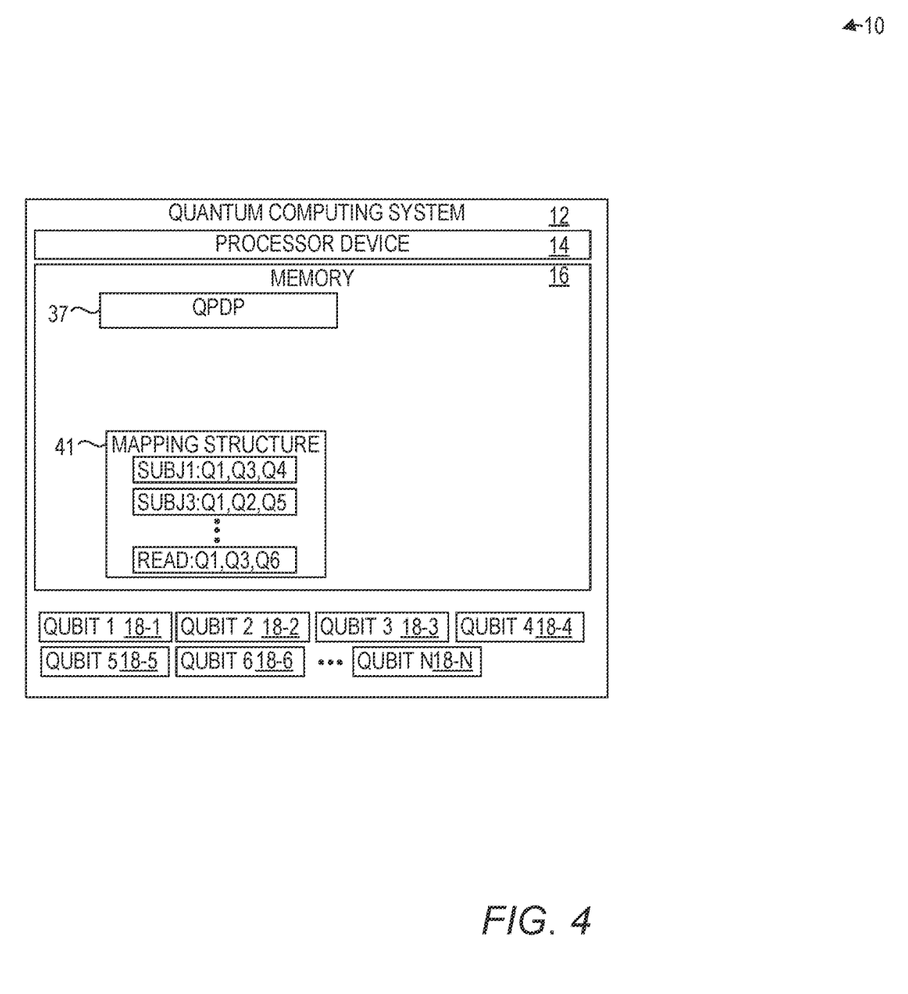
FIG. 4 is a simplified block diagram of the environment illustrated in FIG. 1 according to one implementation.

FIG. 4 is a simplified block diagram of the environment 10 illustrated in FIG. 1 according to one implementation. The environment 10 includes the quantum computing system 12 which in turn includes the memory 16 and the processor device 14 coupled to the memory 16. The processor device 14 is to receive, from a requestor, a first access request that identifies a subject, an action, and a resource. The processor device 14 is further to access the mapping structure 41 that identifies the plurality of qubits 18 that are in superposition and encoded with a plurality of rules that govern access to the resource. The processor device 14 is further to determine, based on the mapping structure 41, a set of qubits 18 of the plurality of qubits 18 that applies to the access request. The processor device 14 is further to provide data encoded in the set of qubits 18 or a reference to each qubit 18 in the set of qubits 18 to the requestor.

Figure 5:
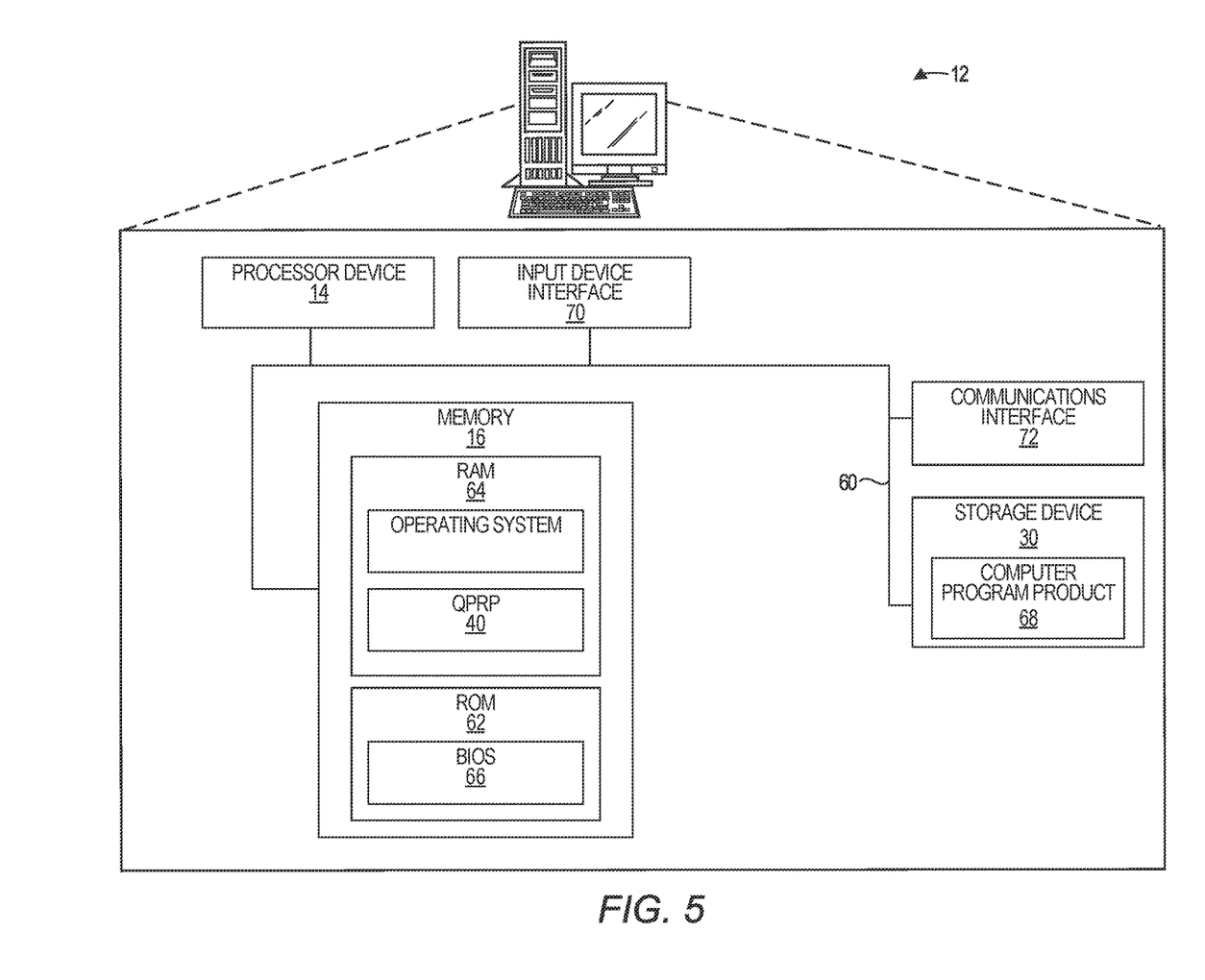
FIG. 5 is a block diagram of the quantum computing system illustrated in FIGS. 1, 2 and 4 according to one implementation.

FIG. 5 is a block diagram of the quantum computing system 12 suitable for implementing examples according to one example. The quantum computing system 12 includes the processor device 14, the system memory 16, and a system bus 60. The system bus 60 provides an interface for system components including, but not limited to, the system memory 16 and the processor device 14. The processor device 14 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The system memory 16 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the quantum computing system 12. The volatile memory 64 may also include a high-speed RAM, such as static RAM, for caching data.

The quantum computing system 12 may further include or be coupled to a non-transitory computer-readable storage medium such as the storage device 30, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 30 and other drives associated with computer-readable media and computer-usable media may provide non-volatile storage of data, data structures, computer-executable instructions, and the like.

A number of modules can be stored in the storage device 30 and in the volatile memory 64, including an operating system and one or more program modules, such as the QPRP 40, which may implement the functionality described herein in whole or in part. All or a portion of the examples may be implemented as a computer program product 68 stored on a transitory or non-transitory computer-usable or computer-readable storage medium, such as the storage device 30, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the QPRP 40 in the volatile memory 64, may serve as a controller, or control system, for the quantum computing system 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 70 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include a communications interface 72 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum computing system from a requestor, a first access request that identifies a subject, an action, and a resource;
   accessing a mapping structure that identifies a plurality of qubits that are in superposition and encoded with a plurality of rules that govern access to the resource;
   determining, based on the mapping structure, a set of qubits of the plurality of qubits that applies to the access request; and
   providing data encoded in the set of qubits or a reference to each qubit in the set of qubits to the requestor.

2. The method of claim 1 wherein providing data encoded in the set of qubits or the reference to each qubit in the set of qubits to the requestor further comprises reading out each qubit in the set of qubits to obtain the data encoded in the set of qubits.

3. The method of claim 1 wherein the set of qubits comprises a fewer number of qubits than the plurality of qubits.

4. The method of claim 1 further comprising:
determining the one or more quantum instruction files of a plurality of quantum instruction files that govern access to the resource, the one or more quantum instruction files comprising quantum instructions to, when initiated, modify the plurality of qubits to contain the rules that govern access to the resource; and
initiating the one or more quantum instruction files to place the plurality of qubits into superposition encoded with the rules.

5. The method of claim 4 further comprising:
determining a quantity of qubits to be used by the one or more quantum instruction files; and
allocating the plurality of qubits based on the quantity of qubits to be used by the one or more quantum instruction files.

6. The method of claim 5 wherein determining the quantity of qubits to be used by the one or more quantum instruction files comprises accessing quantum instruction file metadata that corresponds to the one or more quantum instruction files, the quantum instruction file metadata identifying the quantity of qubits to be used by the one or more quantum instruction files.

7. The method of claim 5 wherein determining the quantity of qubits to be used by the one or more quantum instruction files comprises parsing quantum instructions in the one or more quantum instruction files to determine the quantity of qubits to be used by the one or more quantum instruction files.

8. The method of claim 1 wherein the subject comprises a quantum task executing on the quantum computing system.

9. The method of claim 1 wherein the subject comprises a classical task executing on a classical computing device that is communicatively coupled to the quantum computing system.

10. The method of claim 1 wherein the subject comprises a quantum task executing on the quantum computing system, and wherein the resource comprises a qubit implemented on the quantum computing system.

11. The method of claim 1 further comprising:
determining, based on processing the plurality of qubits, that the subject does not have privileges to perform the action on the resource; and
denying the access request.

12. The method of claim 1 further comprising:
accessing a plurality of quantum instruction files, each quantum instruction file comprising quantum instructions to, when initiated, modify a plurality of qubits to contain rules that govern an access request;
generating, based on the plurality of quantum instruction files, an aggregate quantum instruction file that combines the rules;
and where the first quantum instruction file comprises the aggregate quantum instruction file.

13. The method of claim 1 further comprising:
generating, by the quantum computing system, the mapping structure, the mapping structure comprising data that maps subjects, actions and resources identified in the plurality of rules that govern access to the resource to specific qubits of the plurality of qubits.

14. The method of claim 13 wherein generating the mapping structure further comprises:
parsing a plurality of quantum instruction files to identify one or more subjects, actions and resources; and
determining in which qubits of the plurality of qubits the subjects, actions and resources have been encoded.

15. A quantum computing system, comprising:
a memory; and
a processor device coupled to the memory to:
receive, by a quantum computing system from a requestor, a first access request that identifies a subject, an action, and a resource;
access a mapping structure that identifies a plurality of qubits that are in superposition and encoded with a plurality of rules that govern access to the resource;
determine, based on the mapping structure, a set of qubits of the plurality of qubits that applies to the access request; and
provide data encoded in the set of qubits or a reference to each qubit in the set of qubits to the requestor.

16. The quantum computing system of claim 15 wherein to provide the data encoded in the set of qubits or the reference to each qubit in the set of qubits to the requestor, the processor device is further to:
read out each qubit in the set of qubits to obtain the data encoded in the set of qubits.

17. The quantum computing system of claim 15 wherein the processor device is further to:
determine the one or more quantum instruction files of a plurality of quantum instruction files that govern access to the resource, the one or more quantum instruction files comprising quantum instructions to, when initiated, modify the plurality of qubits to contain the rules that govern access to the resource; and
initiate the one or more quantum instruction files to place the plurality of qubits into superposition encoded with the rules.

18. A non-transitory computer-readable storage medium that includes executable instructions to cause a processor device of a quantum computing system to:
receive, by a quantum computing system from a requestor, a first access request that identifies a subject, an action, and a resource;
access a mapping structure that identifies a plurality of qubits that are in superposition and encoded with a plurality of rules that govern access to the resource;
determine, based on the mapping structure, a set of qubits of the plurality of qubits that applies to the access request; and
provide data encoded in the set of qubits or a reference to each qubit in the set of qubits to the requestor.

19. The non-transitory computer-readable storage medium of claim 18 wherein to provide the data encoded in the set of qubits or the reference to each qubit in the set of qubits to the requestor, the instructions further cause the processor device to read out each qubit in the set of qubits to obtain the data encoded in the set of qubits.

20. The non-transitory computer-readable storage medium of claim 18 wherein the instructions further cause the processor device to:
determine the one or more quantum instruction files of a plurality of quantum instruction files that govern access to the resource, the one or more quantum instruction files comprising quantum instructions to, when initiated, modify the plurality of qubits to contain the rules that govern access to the resource; and initiate the one or more quantum instruction files to place the plurality of qubits into superposition encoded with the rules.

* * * * *